United States Patent
Bittner

(10) Patent No.: US 11,484,023 B2
(45) Date of Patent: Nov. 1, 2022

(54) SPRAY BOOM SUPPORT STRUCTURE

(71) Applicant: CNH Industrial America LLC, New Holland, PA (US)

(72) Inventor: Roy A. Bittner, Cato, WI (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 459 days.

(21) Appl. No.: 16/444,087

(22) Filed: Jun. 18, 2019

(65) Prior Publication Data

US 2020/0396978 A1 Dec. 24, 2020

(51) Int. Cl.
| | | |
|---|---|---|
| *A01M 7/00* | (2006.01) | |
| *A01G 25/09* | (2006.01) | |
| *A01B 76/00* | (2006.01) | |
| *A01B 73/02* | (2006.01) | |

(52) U.S. Cl.
CPC .......... *A01M 7/0071* (2013.01); *A01B 73/02* (2013.01); *A01B 76/00* (2013.01); *A01G 25/09* (2013.01)

(58) Field of Classification Search
CPC ...... A01M 7/0071; A01B 73/02; A01B 76/00; A01G 25/09
USPC ................................................ 239/159–170
See application file for complete search history.

(56) References Cited

U.S. PATENT DOCUMENTS

| | | | |
|---|---|---|---|
| 6,966,501 B2 * | 11/2005 | Wubben | A01M 7/0071 239/168 |
| 2006/0201075 A1 | 9/2006 | Rivas et al. | |
| 2010/0065667 A1 | 3/2010 | Vacek-Vesely et al. | |
| 2016/0038961 A1 | 2/2016 | Carlson et al. | |
| 2016/0262371 A1 | 9/2016 | Hiddema et al. | |
| 2017/0000103 A1 | 1/2017 | Wissler et al. | |
| 2018/0087565 A1 | 3/2018 | Tortorella et al. | |

FOREIGN PATENT DOCUMENTS

AU 2016204514 A1 1/2017

OTHER PUBLICATIONS

Anna McConnell; John Deere Launches New Sprayer Cab; Feb. 21, 2017; 7 pages; available at: https://www.agriculture.com/machinery/spraying/john-deere-launches-new-sprayer-cab-132-foot-boom.

* cited by examiner

*Primary Examiner* — Christopher S Kim
(74) *Attorney, Agent, or Firm* — Rebecca Henkel; Rickard DeMille

(57) ABSTRACT

A spray boom support structure includes a first support member, a second support member, a plurality of vertical support elements disposed between the first and second support member along lengths of the first and second support members, and at least one strut. Each vertical support element includes a bottom saddle portion coupled to first support member, a top saddle portion coupled to the second support member, and an I-beam portion disposed between the top and bottom saddle portions. Further, each strut extends between adjacent vertical support elements.

10 Claims, 5 Drawing Sheets

SPRAY BOOM SUPPORT STRUCTURE

FIELD OF THE INVENTION

The present invention relates generally to a spray boom support structure for an agricultural sprayer, and, more particularly, a vertical support element of the spray boom truss structure constructed to optimize strength and weight.

BACKGROUND OF THE INVENTION

As spray booms get larger over time, alternate structural materials to steel become more attractive, due to the altering relationships between cost, weight, and stress characteristics. Modern injection molded plastics are not only light and easy to manufacture, they also stand up well under compressive and tensions loads, and can be shaped to simultaneously flex under loads from other directions. This combination of affordably producing rigidity in certain directions and flexibility in others is exploited in this truss element design.

Generally, the more rigid a spray boom is, the easier it is to tune its suspension to perform well. Paradoxically, the longer a boom, the more it will flex. Further, the more gussets added generate additional stress points and more weight. In classic 2D truss analysis, the joints are assumed to be pinned, reducing the elements to simple two-force members, reducing the internal sources of stress, making the calculations easier. This is also true in the real world, the more flexible the joints are, the less the members are stresses locally, and the more ridged the structure can be globally.

SUMMARY OF THE INVENTION

According to an aspect of the invention, a spray boom support structure includes a first support member, a second support member, a plurality of vertical support elements disposed between the first and second support member along lengths of the first and second support members, and at least one strut. Each vertical support element includes a bottom saddle portion coupled to first support member, a top saddle portion coupled to the second support member, and an I-beam portion disposed between the top and bottom saddle portions. Further, each strut extends between adjacent vertical support elements.

In accordance with another aspect of the invention, a top of the I-beam portion transitions to the top saddle via a top neck portion. Similarly, a bottom of the I-beam portion transitions to the bottom saddle via a bottom neck portion. A width of the bottom neck portion is greater than a width of the top neck portion. In addition, an inner surface of the top saddle is configured to match a contour of a lower surface of the second support member. Likewise, an inner surface of the bottom saddle is shaped to receive the second support member.

In accordance with yet another aspect of the invention, the I-beam portion includes a web, a first flange disposed at a first side of the web, and a second flange disposed at a second side of the web. The first and second flanges are oriented perpendicular to the web. A first end of the first flange and a second end of the first flange are spaced apart from the web. Similarly, a first end of the second flange and a second end of the second flange are also spaced apart from the web.

In accordance with another aspect of the invention, each strut includes a first rod extending from one of the adjacent vertical support elements and a second rod extending from another of the adjacent vertical support elements. The first and second rods are oriented along a same axis and attached to each other.

In accordance with yet another aspect of the invention, the first rod includes a tube section disposed at a distal end thereof. The tube section includes an orifice formed in a distal end thereof. Further, the orifice is configured to receive the second rod. Additionally, the second rod includes a head formed at a distal end thereof. The distal end of the second rod is disposed within the tube section of the first rod. A diameter of the head is larger than a diameter of the orifice. In addition, an elastomeric material is disposed within the tube section of the first rod. For example, the elastomeric material is disposed between an inner surface of the tube section of the first rod and an outer surface of the second rod.

According to another aspect of the invention, a vertical support element includes a top saddle portion, a bottom saddle portion, and an I-beam portion disposed between the top and bottom saddle portions. The bottom saddle is shaped to receive a first support member, while the top saddle is shaped to receive a second support member.

In accordance with yet another aspect of the invention, the I-beam portion transitions to the top saddle via a top neck portion. Similarly, the I-beam portion transitions to the bottom saddle via a bottom neck portion. The bottom neck portion has a width greater than that of the top neck portion.

In accordance with another aspect of the invention, the I-beam portion includes a web and flanges disposed at a first side of the web and a second side of the web, respectively. Each flange is oriented perpendicular to the web and extends a length from a first end to a second end. Further, the length of each flange is greater than a thickness of the web.

According to yet another aspect of the invention, a spray boom strut includes a first rod and a second rod oriented along an axis. A distal end of the second rod is disposed within a distal end of the first rod.

In accordance with another aspect of the invention, the first rod includes a tube disposed at the distal end thereof. The tube has a diameter greater than that of the second rod, and the distal end of the second rod is disposed within the tube. Further, the tube of the first rod includes an orifice formed in a distal end thereof, which is configured to receive the second rod. The second rod includes a head formed at the distal end thereof, and a diameter of the head is larger than that of the orifice.

In accordance with yet another aspect of the invention, an elastomeric material disposed within the tube. For example, the elastomeric material is disposed between an inner surface of the tube and an outer surface of the second rod.

These and other aspects and features of the present invention will be more fully understood from the following detailed description and the enclosed drawings.

Figure 1:
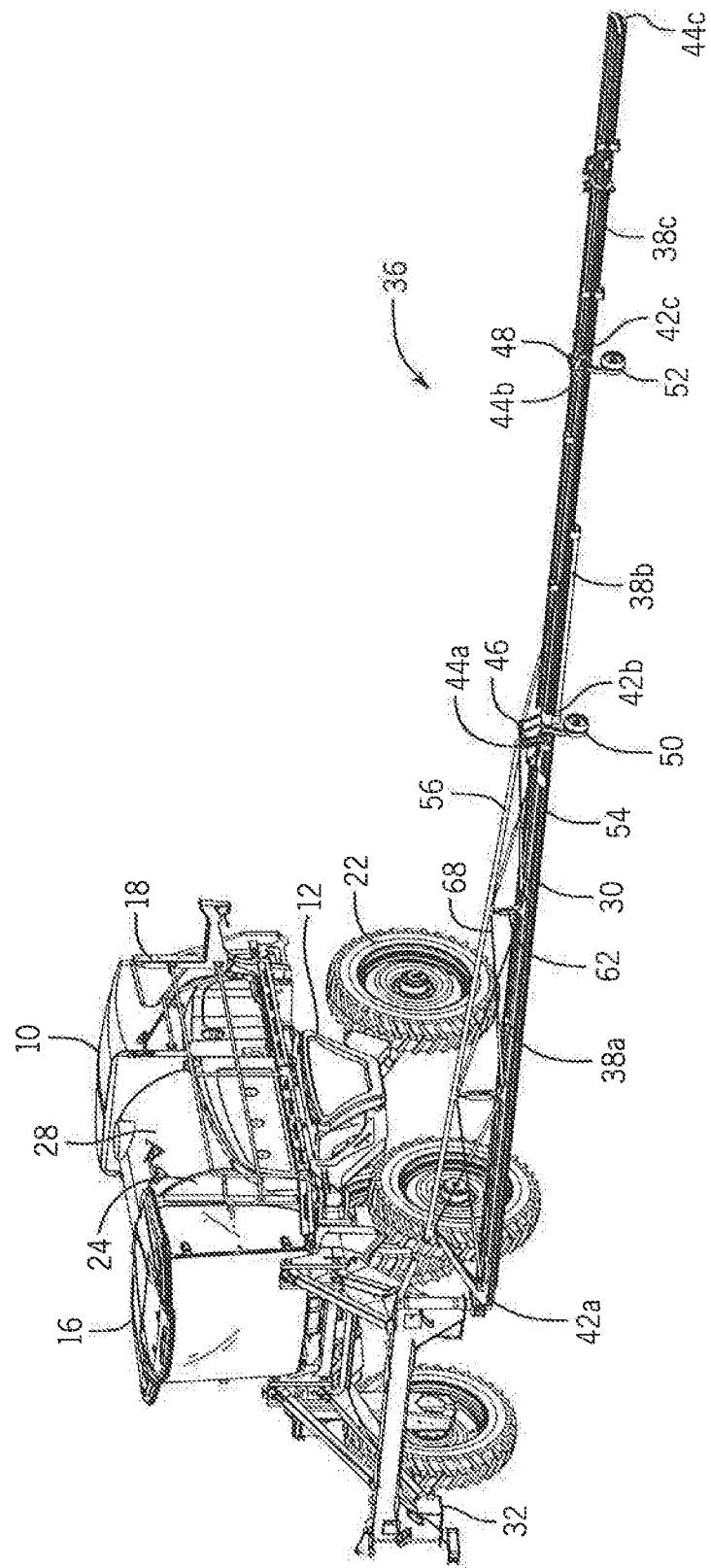
FIG. 1 is a perspective view of an agricultural sprayer having a spray boom in an extended position.

Before describing any preferred, exemplary, and/or alternative embodiments of the invention in detail, it is to be understood that the invention is not limited to the details of construction and the arrangement of the components set forth in the following description or illustrated in the drawings. The invention is capable of other embodiments or being practiced or carried out in various ways. It is also to be understood that the phraseology and terminology employed herein is for the purpose of description and should not be regarded as limiting.

DETAILED DESCRIPTION

Referring now to the drawings and specifically to FIG. 1, aspects of the invention are shown for use with an agricultural machine 10, for example, but not limited to, an agricultural sprayer. The agricultural machine 10 shown in FIG. 1 is a self-propelled agricultural sprayer vehicle or self-propelled sprayer 10, shown here as a front-boom sprayer. Although sprayer 10 is shown as a front-boom self-propelled sprayer, it is understood that the sprayer 10 may instead be configured as a rear-boom sprayer.

Still referring to FIG. 1, the sprayer 10 includes a chassis 12 having a chassis frame 14 that supports various assemblies, systems, and components. These various assemblies, systems, and components can include an operator cab 16, an engine 18, and a hydraulic system 20. The hydraulic system 10 receives power from the engine 18 and includes at least one hydraulic pump which can e in a hydrostat arrangement for providing hydraulic pressure for operating hydraulic components within the hydraulic system 20. For sprayers with hydrostatic drives, hydraulic motors are operably connected to the hydraulic pump(s) for rotating the wheels 22. In mechanical drive applications, a mechanical transmission receives power from the engine 18 and delivers power for rotating the wheels 22 by way of power-transmitting driveline components such as drive shafts, differentials, and other gear sets in portal, drop boxes, or other housings. A spray system 24 can include storage containers such as a product tank 28 for storing a volume of product for delivery onto an agricultural field with the sprayer 10. A product delivery pump can convey product from the product tank 28 through plumbing components such as interconnected pieces of tubing and through a boom tubing system for release out of spray nozzles that are spaced from each other along the width of boom 30 during spraying operations of the sprayer 10. Groups or banks of multiple adjacent spray nozzles define multiple spray sections of the spray system. Spray sections are defined along the boom 30 and selectively deliver product for release onto an agricultural field at locations corresponding to positions of activated spray sections. The boom 30 is connected to the chassis 12 with the lift arm assembly 32 that is configured to manipulate the boom 30 in a variety of directions to both adjust the height of application of the product and transition the boom 30 between a retracted position 34, as shown in FIG. 10, and an extended position 36, as shown in FIG. 1. While FIGS. 1, 4-6, and 9-10 display a single boom 30 coming from one side of the lift arm assembly 32, embodiments of the invention may include a boom 30 coming from both sides of the lift arm assembly 32.

As further shown in FIG. 1, the spray boom 30 includes a number of sections 38. In the extended position 36, the sections 38 of the boom 30 are oriented in line with each other so as to extend outward and be cantilevered from the lift arm assembly 32 of the sprayer 10. The sections 38 are configured to be connected to each other via hinges that allow the sections 38 to fold in on each other and transition the boom 30 from the extended position 36 to a folded position 40, as shown in FIGS. 6-9. The boom 30 may then be rotated from the folded position 40, in which the boom 30 is perpendicular to the sprayer 10, to the retracted position 34, in which the boom 30 is parallel to the sprayer 10. In the representative embodiment of the invention, the spray boom 30 includes three (3) sections 38. In other embodiments, of the invention, the spray boom 30 may include any number of sections 38.

As stated above, FIG. 1 depicts the spray boom 30 in the extended position 36. Each section 38 extends from a first end 42 to a second end 44. The first section 38a is positioned adjacent the sprayer 10. As shown, the first end 42a of the first section 38a is coupled to the lift arm assembly 32 of the sprayer 10. Meanwhile, the first end 42b of the second section 38b is pivotably coupled to the second end 44a of the first section 38a via a hinge 46. Similarly, the first end 42c of the third section 38c is pivotably coupled to the second end 44b of the second section 38b via another hinge 48. In the representative embodiment of the invention, a wheel 50 is disposed at hinge 46 and a wheel 52 is disposed at hinge 48. The wheels 50, 52 are configured to extend from the boom 30 and contact the ground in order to assist in supporting the boom 30 when it is in the extended position 36.

Figure 2:
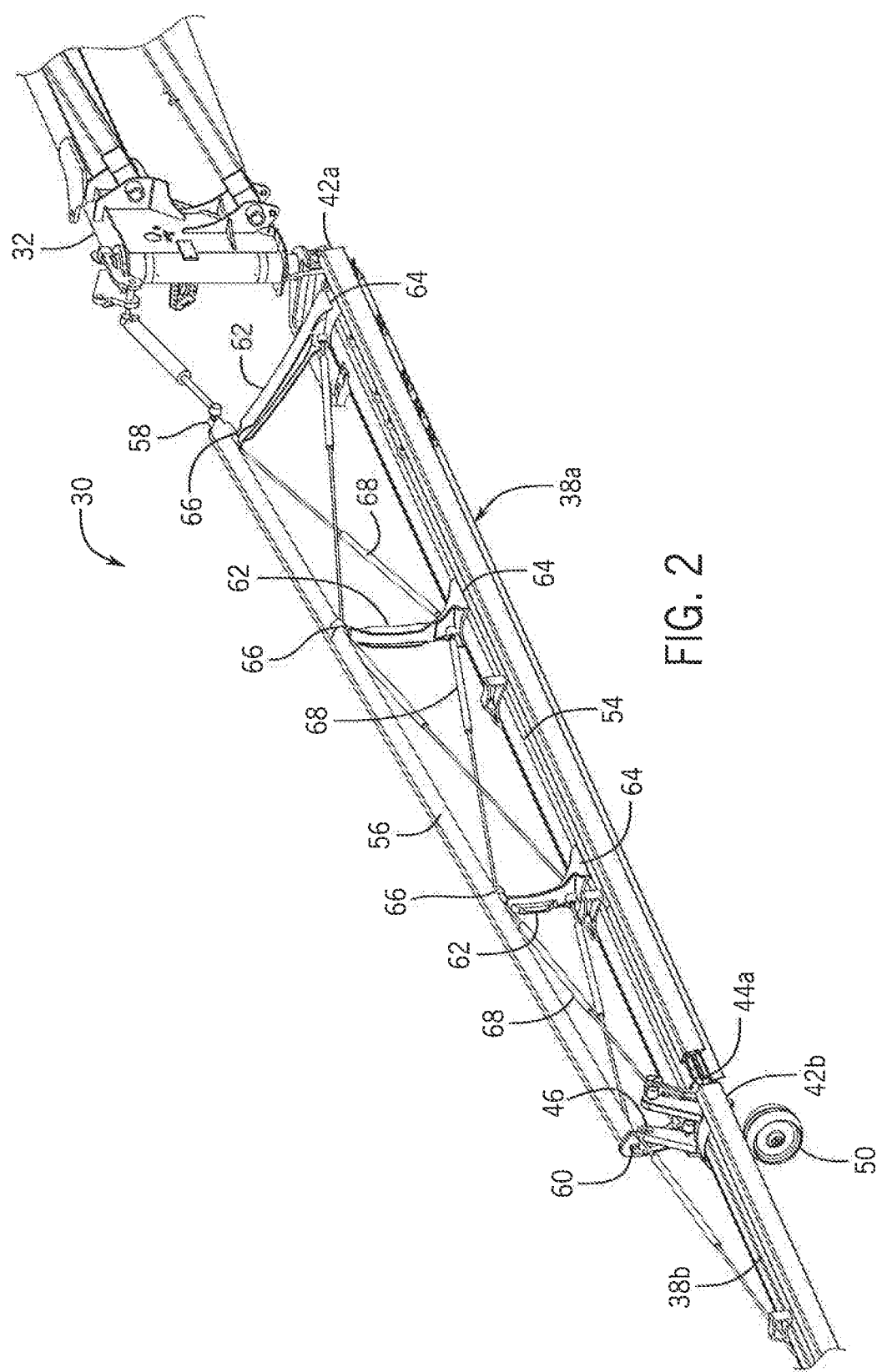
FIG. 2 is an enlarged perspective view of a section of the spray boom of FIG. 1.

Referring next to FIG. 2, an enlarged perspective view is shown of the first section 38a of the boom 30. The first section 38a includes a first support member 54 and a second support member 56. When the boom 30 is in the extended position 36, the first support member 54 may be oriented parallel to the ground. However, adjustment of the lift arm assembly 32 adjusts the height of the first end 42a of first section 38a, which may affect the orientation of the first support member 54 as it extends from the first end 42a to the second end 44a. The second support member 56 is disposed above the first support member 54 and extends from a first end 58 to a second end 60. As shown in FIG. 2, the second support member 56 may be oriented at an angle with respect to the first support member 54. For example, the second support member 56 may be oriented so that the second end 60 is closer to the first support member 54 than the first end 58.

A number of vertical support members or elements 62 may be oriented to extend from the first support member 54 to the second support member 56. Each vertical support element 62 includes a first end 64 coupled to the first support member 54 and a second end 66 coupled to the second support member 56. As shown in FIG. 2, the vertical support elements 62 may be distributed along the length of the first section 38a of the boom 30. While the representative embodiment of the invention illustrates the use of three (3) vertical support element 62, varying embodiment of the invention may use any number of vertical support elements 62 extending between any locations along the lengths of the first and second support members 54, 56. As will be described in further detail below, the vertical support elements 62 are configured to offset the support members 54, 56 so that they are oriented along different vertical planes.

The first section 38a may also include a number of struts 68 extending between adjacent vertical support elements 62. The first section 38 may include struts 68 along the entire length of the first section 38a, from a location adjacent the first end 42a to a location adjacent the second end 44a. In the representative embodiment of the invention, two (2) struts 68 extend between adjacent vertical support elements 62. For example, one strut 68 may extend from the second end 66 of the vertical support element 62 adjacent the first end 58 of the second support member 56 to the first end 64 of the next vertical support element 62, while another strut 68 may extend from the first end 64 of the vertical support element 62 adjacent the first end 58 of the second support member 56 to the second end 66 of the next vertical support element 62. That is, the two (2) struts 68 between each vertical support element 62 may crisscross as they extend between the vertical support elements 62. FIG. 2 further illustrates that a strut 68 may extend from the hinge 46 to a location on the second section 38b.

In another embodiment of the invention, a single strut 68 may extend from the second end 66 of the vertical support element 62 adjacent the first end 58 of the second support member 56 to the first end 64 of the next vertical support element 62, another strut 68 may extend from the first end 64 of that vertical support element 62 to the second end 66 of the next vertical support element 62, and anther strut 68 may extend from the second end 66 of the that vertical support element 62 to the hinge 46 located adjacent the second end 44a of the section 38a. That is, adjacent struts 68 are oriented to alternate diagonally between the first and second ends 64, 66 of adjacent vertical support elements 62 as the struts 68 span the length of the section 38a. As a result, the second and third sections 38b, 38c are supported by the strength of the support members 54, 56, vertical support elements 62, and struts 68 of the first section 38a.

Figure 3:
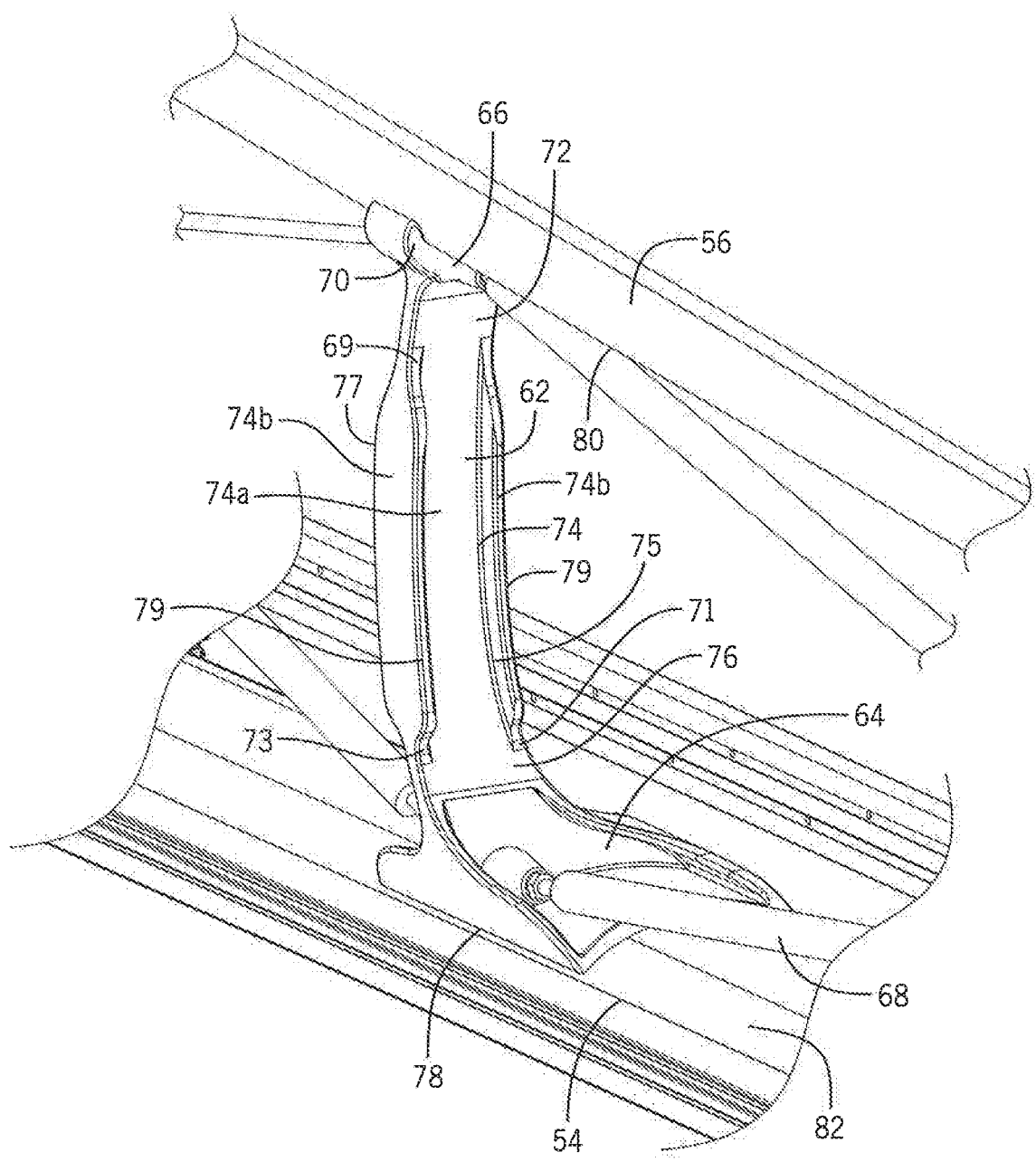
FIG. 3 is an enlarged perspective view of the section of the spray boom having a vertical support element.
Figure 4:
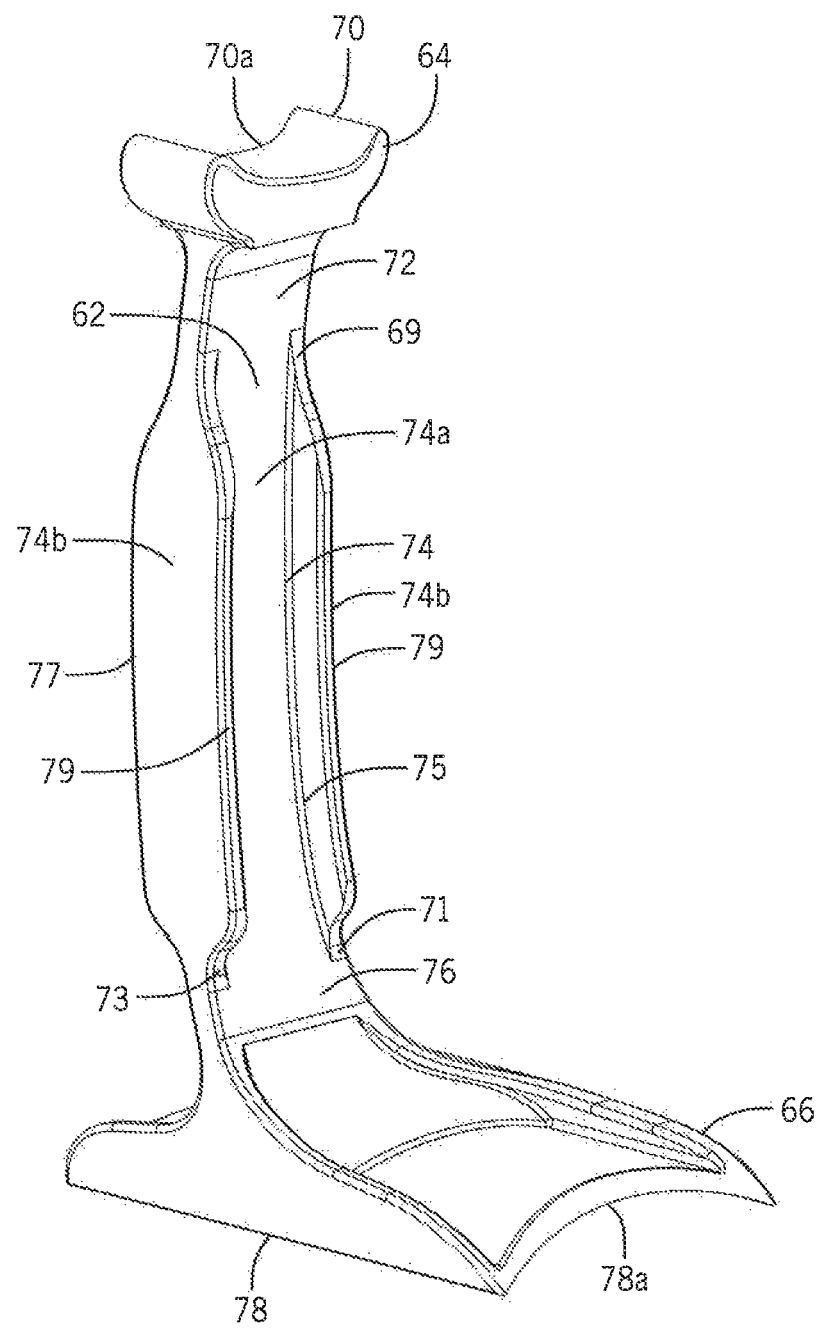
FIG. 4 is a perspective view of the vertical support element of the spray boom of FIG. 3.

Next, FIGS. 3 and 4 depict a vertical support element 64 according to the representative embodiment of the invention. The vertical support element 64 includes a top saddle portion shown as top saddle 70, a top neck portion 72, an I-beam portion 74, a bottom neck portion 76, and a bottom saddle portion shows as bottom saddle 78. The top saddle 70 of the vertical support element 64 is shaped to correspond with a lower surface 80 of the second support member 56. In other words, the inner surface 70a of the top saddle is shaped to match the contour of the lower surface 80 of the second support member 56. As such, the second support member 56 is received and interfits with the top saddle 70 of the vertical support element 64. Similarly, the bottom saddle 78 of the vertical support element 64 is shaped to correspond with an upper surface 82 of the first support member 54. That is, an inner surface 78a of the bottom saddle is shaped to match the contour of the upper surface 82 of the first support member 54. As a result, the first support member 54 is received and interfits with the bottom saddle 78. The above configurations result in a consistent bonding surface for the top saddle 70 to be coupled to the second support member 56 and the bottom saddle 78 to be coupled to the first support member 54.

As shown in FIG. 3, struts 68 attached to a lower portion of the vertical support elements 64 may be coupled to the bottom saddle 78 of the vertical support element 64. In other embodiments of the invention, the strut 68 may be coupled to the bottom neck portion 76 of the vertical support element 64 or any location between the bottom neck portion 76 and the bottom saddle 78. Similarly, FIG. 3 depicts the strut 68 attached to an upper portion of the vertical support element 64 as being coupled to the top saddle 70 of the vertical support element 64. Alternatively, the strut 68 may be coupled to the top neck portion 72 of the vertical support element 64 or any location between the top saddle 70 and the top neck portion 72.

The I-beam portion 74 includes a web 74a and flanges 74b that form the I-beam profile of the portion 74. The web 74a extends from a first side 73 to a second side 75 in a direction perpendicular to the direction of orientation of the first and second support members 54, 56. The flanges 74b are disposed at the first and second sides 73, 75 of the web 74a and oriented perpendicular to the web 74a. Each flange 74b extends for a length from a first end 77 to a second end 79. In the representative embodiment of the invention, the length of each flange 74b is greater than the thickness of the web 74a. Further yet, the first and second ends 77, 79 of the flange 74b is spaced apart from web 74a in order to form an I-beam profile. The I-beam cross-section of the portion 74 allows axial torsion while resisting compression and bending. Additionally, and as shown in FIG. 2, each vertical support element 62 and its I-beam portion 74 and web 74a may be oriented vertically, at an angle, and/or be curved as its I-beam portion 74 extends from the bottom neck portion 76 to the top neck portion 72.

In the representative embodiment of the invention, each flange 74b is tapered as the I-beam portion 74 transitions to the top neck portion 72 and the bottom neck portion 76. That is, the length of each flange 74b is transitioned from its greatest at a mid-point of the I-beam portion 74 to equal to the thickness of the web 74a at the top 69 and bottom 71 of the I-beam portion 74, where the I-beam portion 74 transitions to the top and bottom neck portions 72, 76. In other embodiments of the invention, the length of the flanges 74b may be consistent from the top 69 of the I-beam portion 74 to the bottom 71 of the I-beam portion 74. In yet other embodiments of the invention, the length of the flanges 74b may taper to the thickness of the web 72a at a location spaced apart from the top 69 and bottom 71 of the I-beam portion 74.

The top and bottom neck portions 72, 76 transition the vertical support element 62 from the I-beam portion 74 to the top and bottom saddles 70, 78, respectively. The neck portions 72, 76 are configured to allow rotational movement above and below the cross-section of the I-beam portion 74 in order to act as "living hinges" and relieve stress in the boom 30. As shown in FIGS. 3 and 4, a width of the bottom neck portion 76 is greater than a width of the top neck portion 72. By having the neck portion 76 below the I-beam portion 74 be broader than the neck portion 72 below the above the I-beam portion 74, the fore-aft bending loads are sustained by the I-beam portion 74 and its I-beam profile.

Figure 5:
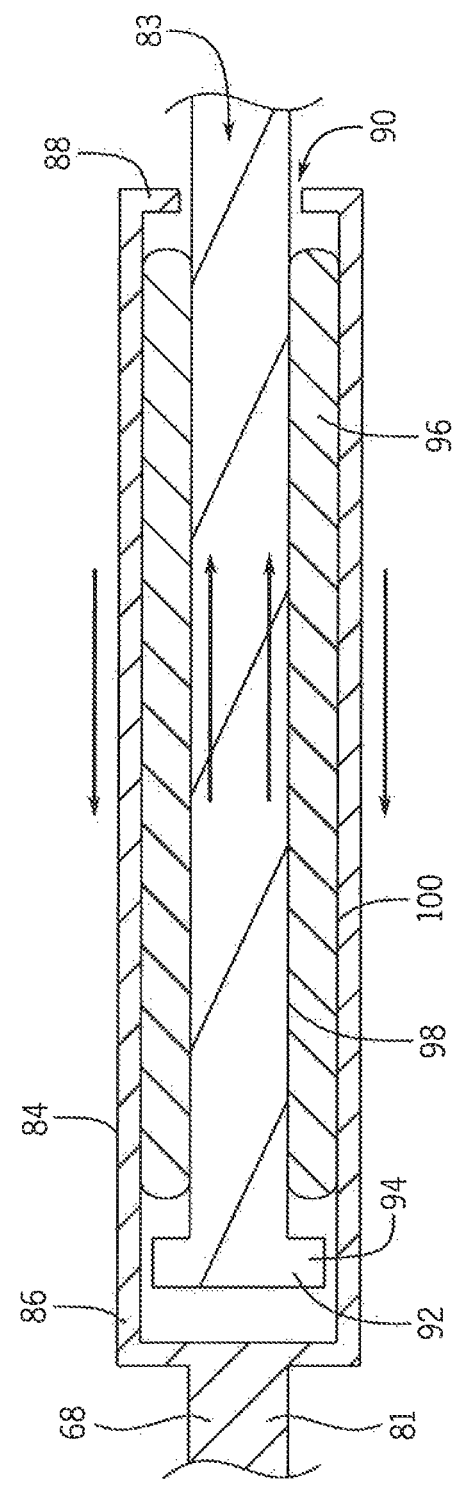
FIG. 5 is a cross-sectional view of a strut of the spray boom of FIG. 2.

Now referring to FIG. 5, a cross-sectional view of an exemplary strut 68 is shown. In the representative embodiment of the invention, the strut 68 includes a first rod 81 and a second rod 83 extending along the same axis of orientation. For example, along a diagonal axis, such as shown in FIG. 2. The first rod 81 includes a tube section shows as tube 84 disposed at a distal end 86. The tube section or tube 84 is configured to have a larger diameter or width than the second rod 83. While the representative embodiment of the invention illustrates the tube 84 as having a larger diameter than the first rod 83, the diameter of the tube 84 may be the same, smaller, or larger than the diameter of the first rod 83.

A distal end 88 of the tube 84 includes an orifice 90 formed therein. In turn, the tube 84 is hollow, so as to receive the second rod 83. In particular, the orifice 90 is sized to have a larger diameter or width than that of the second rod 83. As shown in FIG. 5, a distal end 92 of the second rod 83 includes a head 94 with an increased diameter. That is, the diameter or width of the head 94 is larger than that of the second rod 83 and the orifice 90. As a result, the head 94 prevents the second rod 83 from being removed from the tube 84 of the first rod 81, while flexing to dissipate the accumulated energy in the first section 38a of the boom 30. That is, the first and second rods 80, 82 are attached to each other.

In addition, an elastomeric material 96 may be disposed within the tube 84. The elastomeric material 96 extends between an inner surface 98 of the tube 84 and an outer surface 100 of the second rod 83. Further yet in the representative embodiment of the invention, the elastomeric material 96 is disposed between the distal end 88 of the tube 84 and the head 94 at the distal end 92 of the second rod 83. As a result, the elastomeric material 96 assists in dissipating the accumulated energy. Due to the diagonal nature of the strut 68, the elastomeric material 96 and configuration of the strut 68 assist in dampening vertical movement of the boom 30.

The present invention has been described in terms of the preferred embodiment. The several embodiments disclosed herein are related as being related to the assembly as generally shown in the drawings. It is recognized that equivalents, alternatives, and modifications, aside from those expressly stated, the embodiments summarized, or the embodiment shown in the drawings, are possible and within the scope of the appending claims. The appending claims cover all such alternatives and equivalents.

What is claimed is:

1. A spray boom for an agricultural sprayer, the spray boom having a spray boom support structure comprising:
   a first support member;
   a second support member;
   a plurality of vertical support elements disposed between the first support member and the second support member along lengths of the first support member and the second support member, wherein each of the plurality of vertical support elements comprises:
      a bottom saddle portion coupled to the first support member;
      a top saddle portion coupled to the second support member; and
      an I-beam portion disposed between the top and bottom saddle portions, the I-beam portion including a web, a first flange disposed at a first side of the web, and a second flange disposed at a second side of the web, the first flange and the second flange each terminating below the top saddle portion and above the bottom saddle portion;
   a strut extending between a first vertical support element of the plurality of vertical support elements and a second vertical support element of the plurality of vertical support elements, the first vertical support element and the second vertical support element each distributed along the first support member, wherein the first vertical support element is positioned a first distance from a first end of the first vertical support member and the second support element is positioned a second distance from the first end of the first vertical support member, the second distance being greater than the first.

2. The spray boom of claim 1, wherein a top of the I-beam portion transitions to the top saddle via a top neck portion, and
   wherein a bottom of the I-beam portion transitions to the bottom saddle via a bottom neck portion.

3. The spray boom of claim 2, wherein a width of the bottom neck portion is greater than a width of the top neck portion.

4. The spray boom of claim 1,
   wherein the first and second flanges are oriented perpendicular to the web.

5. The spray boom of claim 4, wherein a first end of the first flange, a second end of the first flange, a first end of the second flange, and a second end of the second flange are spaced apart from the web.

6. The spray boom of claim 1, wherein an inner surface of the top saddle is configured to match a contour of a lower surface of the second support member, and
   wherein an inner surface of the bottom saddle is shaped to receive the first support member.

7. The spray boom of claim 1, wherein each strut comprises:
   a first rod extending from the first vertical support element; and
   a second rod extending from the second vertical support element,
   wherein the first and second rods are oriented along a same axis and attached to each other.

8. The spray boom of claim 7, wherein the first rod includes a tube section disposed at a distal end thereof, and
   wherein the tube section defines an orifice formed in a distal end thereof and configured to receive the second rod.

9. The spray boom of claim 8, wherein the second rod includes a head formed at a distal end thereof, the distal end of the second rod being disposed within the tube section of the first rod, and
   wherein a diameter of the head is larger than a diameter of the orifice.

10. The spray boom of claim 8, further comprising:
    an elastomeric material disposed within the tube section of the first rod.

* * * * *